United States Patent
Scherer

(10) Patent No.: US 10,045,450 B2
(45) Date of Patent: Aug. 7, 2018

(54) COMPUTER CASING AND COMPUTER SYSTEM

(71) Applicant: Fujitsu Technology Solutions Intellectual Property GmbH, München (DE)

(72) Inventor: August Scherer, München (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 0 days.

(21) Appl. No.: 15/832,008

(22) Filed: Dec. 5, 2017

(65) Prior Publication Data

US 2018/0168055 A1 Jun. 14, 2018

(30) Foreign Application Priority Data

Dec. 8, 2016 (DE) .................. 10 2016 123 831

(51) Int. Cl.
*H05K 7/20* (2006.01)
*H05K 5/02* (2006.01)
*E05B 73/00* (2006.01)
*E05B 65/00* (2006.01)

(52) U.S. Cl.
CPC ......... *H05K 5/0221* (2013.01); *E05B 65/006* (2013.01); *E05B 73/0082* (2013.01); *H05K 5/0239* (2013.01)

(58) Field of Classification Search
CPC .................................................. H05K 5/0221
See application file for complete search history.

(56) References Cited

U.S. PATENT DOCUMENTS

| | | | | |
|---|---|---|---|---|
| 3,916,756 A | * | 11/1975 | Yoda | F16B 21/073 24/682.1 |
| 7,894,186 B2 | | 2/2011 | Farrow et al. | |
| 2007/0261308 A1 | | 11/2007 | Sato | |
| 2009/0268412 A1 | * | 10/2009 | Lee | G06F 1/181 361/726 |
| 2010/0039769 A1 | * | 2/2010 | Saisila | E05B 63/0008 361/679.58 |
| 2011/0058331 A1 | | 3/2011 | Mesfin et al. | |
| 2013/0033817 A1 | * | 2/2013 | Wu | E05B 73/0082 361/679.58 |

FOREIGN PATENT DOCUMENTS

DE 10 2012 110 399 A1 4/2014

OTHER PUBLICATIONS

Combined Search and Examination Report dated Feb. 13, 2018, of corresponding GB Application No. 1714750.5.

* cited by examiner

*Primary Examiner* — Anthony Q Edwards
(74) *Attorney, Agent, or Firm* — DLA Piper LLP (US)

(57) ABSTRACT

A computer casing for a computer system includes a chassis that receives components of the computer system, wherein the chassis includes a front side and a rear side opposite the front side; and a removable side panel that can be secured to the chassis to cover an interior of the computer casing; wherein the side panel includes an opening and a displaceable locking element; and in a secured state of the side panel, a Kensington lock formed to secure the side panel to the chassis can be inserted through the opening of the side panel and a fixing opening such that the locking element is actuated in a direction of the front side and mechanically cooperates with the chassis in the region of the front side.

10 Claims, 3 Drawing Sheets

COMPUTER CASING AND COMPUTER SYSTEM

TECHNICAL FIELD

This disclosure relates to a computer casing for a computer system comprising a chassis that receives components of the computer system and a computer system having such a computer casing.

BACKGROUND

It is known that computer casings, in particular casings of so-called desktop computers or tower computers, are typically composed of a chassis with one or multiple removable side panels. Multiple electronic components of the computer system such as a mainboard, storage drives or the like are arranged inside a casing.

Such computer systems often contain highly sensitive components and data to be protected against unauthorized access. In this way, opening the computer casing, e.g. by removing the side panels, on the one hand, and the theft of the entire computer system on the other hand, shall be prevented. In this respect, security devices such as anti-theft locks that secure a computer system as well as locking devices that lock individual side panels of further elements of a computer casing are available.

It could therefore be helpful to provide a secure computer casing that enables particularly high protection against unauthorized opening of the computer casing.

SUMMARY

I provide a computer casing for a computer system including a chassis that receives components of the computer system, wherein the chassis includes a front side and a rear side opposite the front side; and a removable side panel that can be secured to the chassis to cover an interior of the computer casing; wherein the side panel includes an opening and a displaceable locking element; and in a secured state of the side panel, a Kensington lock formed to secure the side panel to the chassis can be inserted through the opening of the side panel and a fixing opening such that the locking element is actuated in a direction of the front side and mechanically cooperates with the chassis in the region of the front side.

I also provide a computer system including the computer casing for a computer system including a chassis that receives components of the computer system, wherein the chassis includes a front side and a rear side opposite the front side; and a removable side panel that can be secured to the chassis to cover an interior of the computer casing; wherein the side panel includes an opening and a displaceable locking element; and in a secured state of the side panel, a Kensington lock formed to secure the side panel to the chassis can be inserted through the opening of the side panel and a fixing opening such that the locking element is actuated in a direction of the front side and mechanically cooperates with the chassis in the region of the front side.

Figure 1:
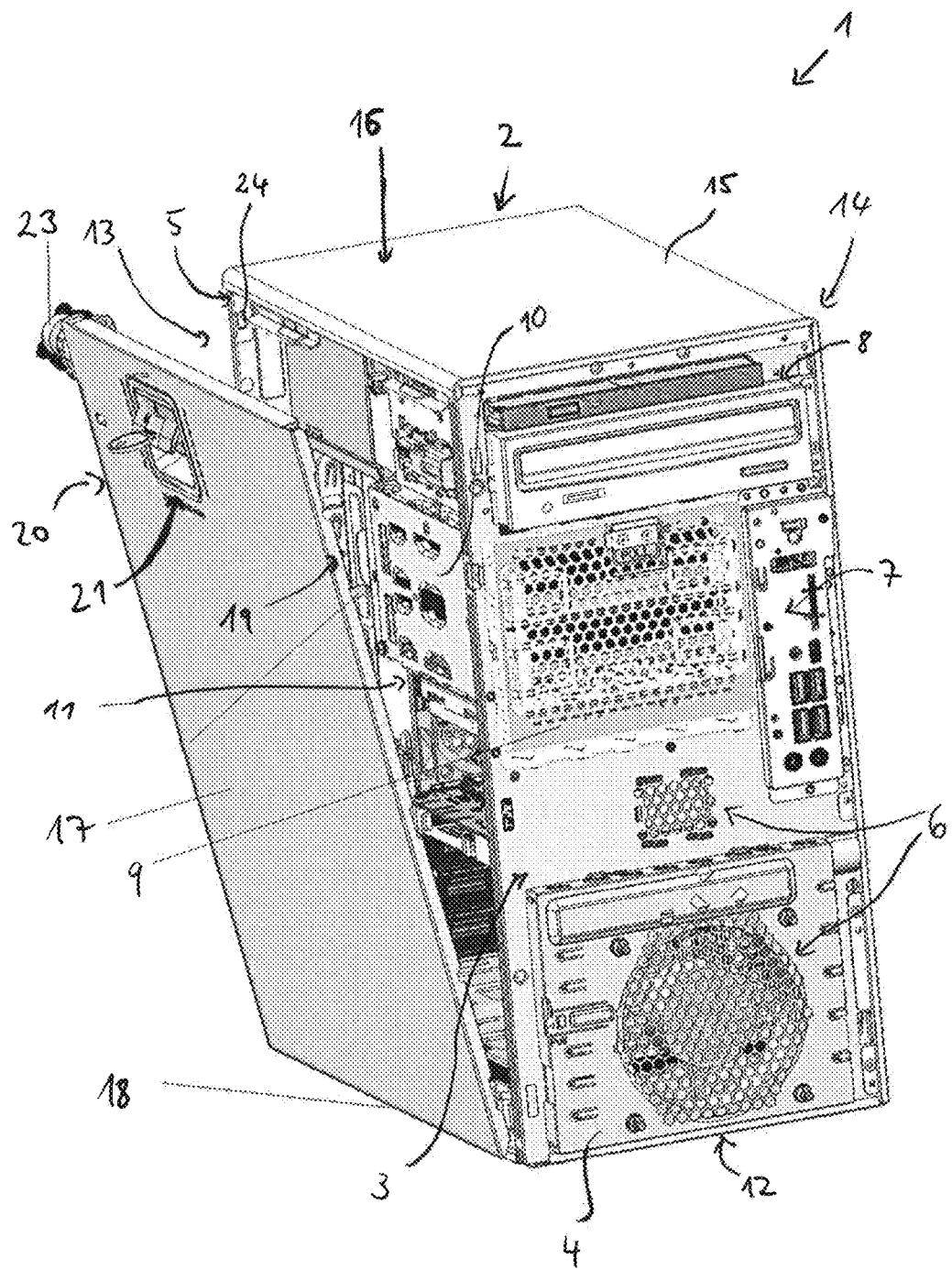
FIG. 1 is a schematic, perspective view of a computer system when mounting a side panel of a computer casing.

LIST OF REFERENCE CHARACTERS 1 computer system
2 computer casing
3 chassis
4 front side
5 rear side
6 ventilation openings
7 terminal area
8 opening for drive
9 hard disk cover
10 hard disk cage
11 interior of the chassis
12 chassis bottom
13 first side
14 second side
15 casing cover
16 upper side
17 side panel
18 bottom side
19 front region
20 rear region
21 closing device
22 engagement element
23 Kensington lock
24 fixing opening
25 locking bar
26 upper edge
27 locking direction
28 locking opening
29 elongate section
30 front end
31 first spring element
32 second spring element
33 coupling element

DETAILED DESCRIPTION

A computer casing for a computer system has a chassis that receives components of the computer system. The chassis has a front side and a rear side opposite the front side. The computer casing has at least one removable side panel that can be secured to the chassis to cover an interior of the computer casing. The side panel comprises an opening. The side panel comprises a displaceable locking element. In the secured state of the side panel, a locking device formed to secure the side panel to the chassis can be inserted through the opening in the side panel of a corresponding fixing opening of the chassis such that the locking element is actuated in the direction of the front side and mechanically cooperates with the chassis in the region of the front side.

The computer casing allows particularly high security against unauthorized opening of the casing. The locking device, which is, for example, an external element to be mounted from the outside such as a lock or the like, can be mounted on one side of the casing, e.g. the rear side. In other words, the opening and the fixing opening are formed such that through these openings the locking device is at least partially insertable and can lock or mechanically secure the side panel to the chassis. By the mounting, the locking element of the side panel is actuated such that it mechanically cooperates with the chassis also at the opposite front side. This cooperation ensures that the side panel is mechanically secured to the chassis on two sides, not on one side. To that end, as in known systems, merely one measure is to be taken by a user, namely attaching and mounting one single locking device. The secured side panel can thus be removed from its secured position only by use of undue force.

In particular, in contrast to a conventional securing of the side panel on one side of the chassis, e.g. the rear side, the side panel is prevented from being opened on the opposite end assigned to the front side despite providing the locking device. The locking device contributes to the fact that easy opening and/or bending of the side panel despite securing is prevented at the front end of the side panel. The side panel, typically suspended at a bottom of the chassis and pivoted toward the chassis in the mounting process, is thus reliably secured on both end regions assigned to the front side and the rear side, respectively.

Furthermore, it is advantageous that the locking device does not affect a further mechanism such as a locking device integrated in the side panel and having an actuatable handle to releasably lock the door. It is thus not necessary to modify the further mechanism. For example, it is not necessary to change a locking bar of the integrated closing device so that it can be blocked by the external locking device. As a result, a mechanical complexity of the components can be held low. Furthermore, the mounting effort is reduced.

Cooperation between the locking element and the chassis is such that removal of the side panel from the chassis is suppressed in the region of the front side. For example, the locking element interacts with the chassis in a form-fit manner, wherein at least one degree of freedom of the side panel to remove this side panel is suppressed. For example, the locking element interacts with a holding element or a corresponding opening of the chassis or is engaged with such, respectively.

The chassis is a base frame, also called base support or casing base, usually produced from electrically conductive material. Usually, these are one or multiple bent and possibly screwed or riveted (steel) sheet parts. One or multiple casing covers, which may also function as side panels, are attached or attachable to the chassis. These side panels can be removable just like the above-mentioned side panel, e.g. for maintenance or service purposes. The rear side and front side can also be referred to as a rear panel and front panel, respectively. The front and/or rear side may have connection regions, mounting cages for drives (hard disks, optical drives and the like), openings for cooling air or fans and/or further implementations.

Between the front side and the rear side, the chassis is open toward a first side, which can be closed or covered by the removable side panel. In other words, the side panel connects the front and rear side of the chassis. The front side and the rear side extend perpendicular to a chassis bottom. The side panel is also perpendicular to the chassis bottom and perpendicular to the front and rear side.

The side panel can also be referred to as side door. For example, the side panel has an integrated locking mechanism that can be actuated via a handle from outside. The opening of the side panel is a locking opening for the locking device, for example. In a state of the side panel secured to the chassis, the opening is arranged aligned with a fixing opening formed in the rear side of the chassis. The locking element is guided on the side panel to be displaceable along a locking direction.

The side panel may comprise an engagement element in a region assigned to the front side of the chassis, this element formed to mechanically cooperate with a further component of the computer system or the chassis to lock them in the secured state of the side panel. The further component is an element such as a grille for a drive cage or the like, a cover, a face plate, or other elements, which is arrangeable on the chassis, detachable and removable. The engagement element, e.g. a pin, bolt, lug or the like cooperates in a form-fit manner with the further component, in analogy to the above, and locks this component in the predetermined position on the chassis. For example, the further component is arranged to be pivotable or foldable on the chassis. For example, the component is moveable between a first position, in which a drive cage is protected from unauthorized access, and a second position in which one or multiple drives can be removed from or inserted in the drive cage. The engagement element mechanically locks the component to the chassis in the first position in the secured state of the side panel in a reliable manner.

The further component may be a drive cover, in particular a cover for one or multiple storage media. For example, it is formed to be pivotable or moveable, as described above.

The locking device may comprise an elongate section guided through the opening and the fixing opening to lock and actuate the locking element. The elongate section is a cylindrical section, for example. As an alternative, it is a locking pin or closing pin, that can be formed T-shaped on a free end, which is inserted in the chassis. The elongate section can be easily guided through these openings and allows a targeted, indirect or direct transmission of force to the locking element.

The locking element may be formed as a locking bar. This bar may be supported on the side panel on a side facing the interior of the chassis in a simple and space-saving manner. Furthermore, the bar can easily interact with the front side of the chassis in the described manner. For example, the bar is supported to be displaceable on one or multiple guide elements of the side panel, for example. For example, these are sheet deformations and/or punchings of the side panel. As an alternative, the guides are separate elements which are preferably produced from sheet metal.

The locking element may be displaceable or moveable on the side panel between a locked position, in which the locking element cooperates with the chassis in the region of the front side, and an unlocked position, in which a removal of the side panel is enabled. In the first position, the side panel can be reliably mounted on the chassis and brought into the predetermined, final position. On the other hand, a mounted side panel can be removed from the chassis. In the second position, the side panel is securely locked on the chassis.

The side panel may comprise a first spring element that cooperates with the locking element such that it is moveable into the locked position against the spring force of the first spring element. In other words, the spring element cooperates with the locking element such that it is held in the unlocked position as long as no locking device cooperates with the locking element or actuates it. In the unlocked position, a pre-tensioning of the spring element may act so that the locking element is pre-tensioned. A stop element can be provided, with the locking element stopping against the stop element and thus being held in the unlocked position. As a result, it is ensured that the side panel can always be removed from the chassis when no locking device is mounted. For example, the spring element acts on the locking element such that the latter is pulled in the direction of the rear side of the chassis.

The rear side of the chassis may comprise a second spring element arranged and/or formed such that, when inserting the locking device to secure the side panel, the second spring element is actuated against a spring force for the transmission of a force to the locking element. The second spring element is formed or designed such that it covers the fixing opening formed in the rear side in a state un-loaded by the locking device, for example. For example, this protects the interior of the chassis from dust or the like. In addition, the second spring element serves to compensate reinforcements of the chassis in the rear panel. These reinforcements are typically formed as bends, deformations in the rear side, in particular as metal butt straps. These protrude parallel to the side panel and perpendicular to the rear side in the direction of the front side of the chassis, for example. This may lead to a n axial offset, e.g. a slot, between the locking device and the locking element that can be compensated by the second spring element. However, this offset is actually necessary since installation of the side panel would otherwise be complicated or even impossible.

The second spring element may comprise a coupling element that is moved against the spring force in the direction of the locking element upon actuation of the second spring element. As a result, the force is transmitted from the locking device to the locking element. In particular, when a first spring element is present, the force can be transmitted from the second to the first spring element so that it is actuated to displace the locking element.

The locking device may be formed as an anti-theft device, in particular a Kensington lock. A Kensington lock is a standardized anti-theft device.

Further advantages are disclosed in the following detailed description of an example. The example is described hereinafter by the appended figures. Like or equivalent elements are provided with like reference characters throughout the figures.

FIG. 1 shows a perspective, schematic view of a computer system 1. The computer system 1 is a desktop computer or a tower computer and has a computer casing 2. The computer casing 2 has a chassis 3 that forms a base support or a base frame of the computer casing 2. Multiple components of the computer system 1, e.g. a mainboard, a power supply unit, a fan and the like are arranged in the interior 11 of the chassis 3.

The chassis 3 is formed of multiple steel sheet components, but other materials, preferably metal materials, are also suitable. The chassis 3 has a front side 4 and a rear side 5 located opposite the front side 4. Perpendicular thereto, connecting the front and rear sides 4, 5, the chassis 3 has a first and second side 13, 14, which are open. The front side 4 and/or the rear side 5 have ventilation openings 6, terminal areas 7 with openings for interface ports, openings 8 for drives and the like. In other words, the front side 4 and the rear side 5 have openings, inter alia, via which components of the computer system 1 are accessible from outside. The front side and rear side 4, 5 of the chassis are metal panels and can also be referred to as front and rear panels. They extend perpendicular to a chassis bottom 12.

One or multiple face plates or covers can be fastened to the front side 4 and/or the rear side 5, covering certain components of the computer system 1 or protecting them against unauthorized access. A hard disk cover 9 (also called drive cover) is mounted at the front side 4, which covers multiple plugin slots for hard disks. The hard disk cover 9 is an additional component of the chassis 3. For example, the hard disks can be inserted into a hard disk cage 10 mounted inside the chassis 3. The hard disk cover 9 is mounted on the chassis 3 in a releasable or removable manner. FIG. 1 shows a first position, a closed position, in which access to the hard disks is prevented. The hard disk cover 9 can be brought into a second, open position so that a mounting or dismounting of hard disks into the hard disk cage 10 is made possible. The hard disk cover 9 is completely removable from the chassis 3. As an alternative, the hard disk cover 9 is rotatably mounted at the front side 4 and is pivoted between the first and second positions.

To protect the components in the interior 11 of the chassis 3, one or multiple metal casing covers or casing panels are provided on the chassis 3, which in particular cover the first and second sides 13, 14. A casing cover 15 is fixedly mounted in the chassis and covers both the second side and an upper side 16 of the chassis at the same time. Furthermore, the chassis has a removable side panel 17 that serves as a cover of the first side 13. The side panel 17 can also be referred to as a side door. Instead of the L-shaped configuration, the casing cover 15 can be divided in two casing covers as an alternative.

The side panel 17 is suspended in the region of the bottom side 18 assigned to the chassis bottom 12, in an articulated manner, e.g. by a lug or the like formed on the side panel 17. The side panel 17 has a front region 19 assigned to the front side 4 and a rear region 20 assigned to the rear side 5 of the chassis 3. Both regions 19 and 20 can also be referred to as opposite end regions and have bent lugs that are perpendicular to the main panel of side panel 17.

For mounting, the side panel 17, after being suspended to the chassis bottom 12, is pivoted toward the chassis 3 so that the side panel is perpendicular to the chassis bottom 12 and the lugs engage around the chassis 3 at the front side 4 and the rear side 5 in the regions 19 and 20 and rest on the front and rear sides 4, 5 in an approximately planar fashion. In this position, the side panel 17 is releasably secured to the chassis 3 or can be secured by additional measures yet.

The side panel has an optional integrated closing device 21 with an actuatable handle which is known. In the final position, the closing device 17 latches on the chassis and/or mechanically cooperates with the chassis 3 via the closing device for holding the side panel 17 on the chassis 3. For cooperation with the chassis 3, the chassis may have one or multiple holding lugs, e.g. in the region of the upper side 16. This position of the side panel 17 is referred to as the secured state, for example. By actuation of the handle, the latching can be released and the side panel 17 can be removed. Further optionally, the closing device 21 can be equipped with a lock and locked via this lock so that an actuation of the handle and the closing device 21 is prevented, respectively.

On the front-end region 19, an engagement element 22 in the form of a pin or bolt is formed, facing in the direction of the chassis 3 both in the state to be mounted and in the final position of the side panel 17. In other words, the engagement element 22 extends perpendicular to the main panel away from the panel. In yet other words, the engagement element 22 substantially extends in a direction parallel to the front side 4 of the chassis 3. In the secured state, the engagement element 22 mechanically cooperates with the hard disk cover 9 such that the hard disk cover 9 cannot be removed or pivoted from the front side 4 of the chassis (not illustrated). In other words, the hard disk cover 9 is locked. In the example, this is achieved by a form-fit cooperation. As a result, the mounted hard disks are secured.

A Kensington lock 23 is indicated in the rear region 20 of the side panel 17, by which the side panel 17 can be secured in the final position on the chassis 3 and, at the same time, the computer system 1 can be protected against theft. The Kensington lock 23 is a locking device in a manner known per se.

To secure the side panel 17, the Kensington lock 23 is guided through a locking opening (not shown in FIG. 1) of the latter and a fixing opening 24 of the rear side 5 of the chassis 3, which is aligned with the locking opening in the secured state.

As mentioned above, I found that by securing the side panel 17 by the Kensington lock 23, a bending of the side panel is possible in a region that faces the front side 4 of the chassis. Hereinafter, the computer system 1 is described in a manner to avoid this problem.

Figure 2:
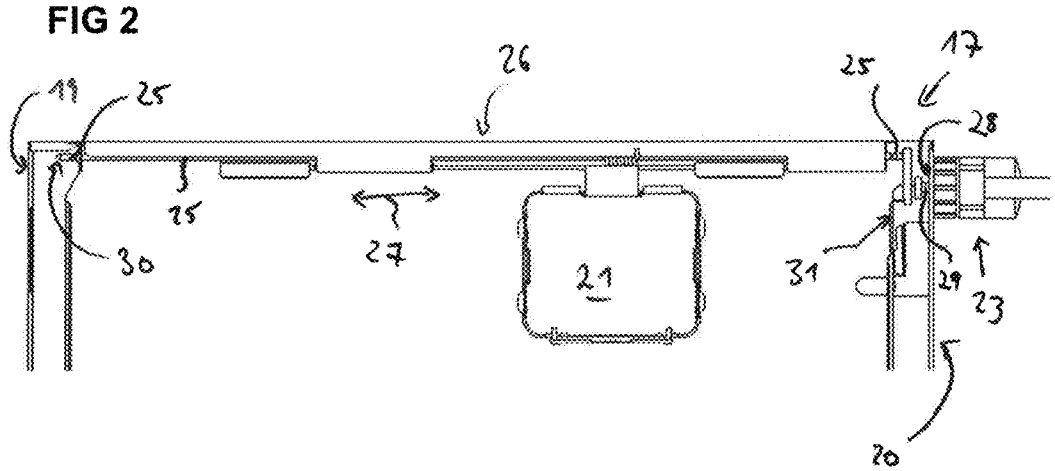
FIG. 2 is a schematic view from inside the side panel with a Kensington lock and a locking element.

FIG. 2 schematically shows an inner side of the side panel 17, on which the Kensington lock 23 is mounted. The inner side faces the interior 11 of the chassis 3 in the properly mounted state.

Irrespective of the closing device 21, a locking bar 25 is supported on the side panel 17. The bar 25 is a locking element. The locking bar 25 is guided on the side panel 17 in a displaceable manner, e.g. by correspondingly shaped and/or arranged guide elements. For example, the side panel 17 has guide lugs to that end, which are bent over. The locking bar 25 can be displaced in parallel to an upper edge 26, i.e. between the front and rear region 19, 20 along a locking direction 27 (see double arrow).

For mounting, the Kensington lock 23 is guided through the external locking opening 28 in the side panel 17 and through the fixing opening 24 by an elongate section, the Kensington lock 23 actuates the locking bar 25 so that this bar is displaced from an unlocked position in the direction of the front region 19, i.e. in the direction of the front side 4 of the chassis 3. In doing so, the locking bar 25 is brought into a locked position and held in this position for as long as the Kensington lock 23 is mounted. In this position, the locking bar 25 cooperates with the chassis 3 such that the side panel 17 is secured to the front side 4 in the front region 19. For example, the front end 30 of the locking bar 25 enters into a corresponding opening of the chassis 3. As a result, the side panel 17 is blocked such that even a bending, as mentioned above, is prevented in the front region.

At the same time, the engagement element 22 is held in the position such that the hard disk cover 9 is kept locked. Thus, by one single measure, namely mounting the Kensington lock 23, the door can be secured, a bending in the region assigned to the front side 4 can be prevented and securing the hard disk cover 9 can be achieved.

Details of the described functionality are described by FIGS. 3 to 6.

The locking bar 25 is held in the unlocked position via a first spring element 31, in which a removal of the side panel 17 is possible. In other words, the spring force of the first spring element 31 acts in the direction of the rear region 20 so that the locking bar 25 is moveable against the spring force in the direction of the front side 4. Optionally, the locking bar 25 is pre-tensioned by the first spring element 31, wherein the locking bar 25 is held against a stop. In the unlocked position, neither a Kensington lock nor another external force acts on the locking bar 25.

Figure 3:
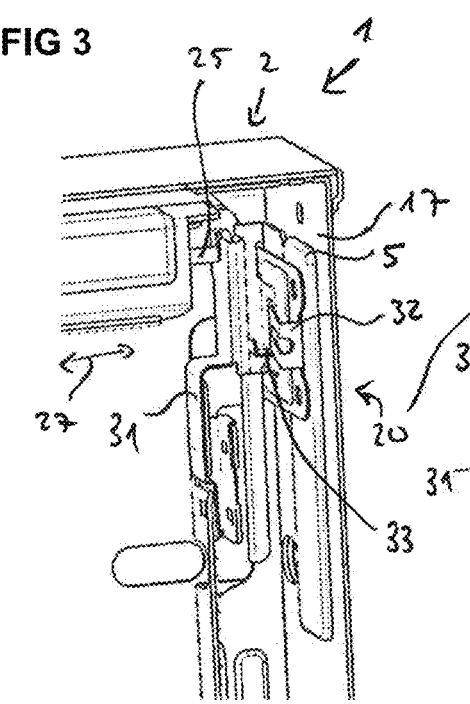
FIG. 3 is a schematic, perspective detail from inside the computer system.

FIG. 3 shows a schematic sectional view detail of the computer system 1 in the region of the Kensington lock 23. It can be discerned that the first spring element 31 is coupled to the locking bar 25 such that forces are transmittable in both directions along the locking direction 27.

Figure 4:
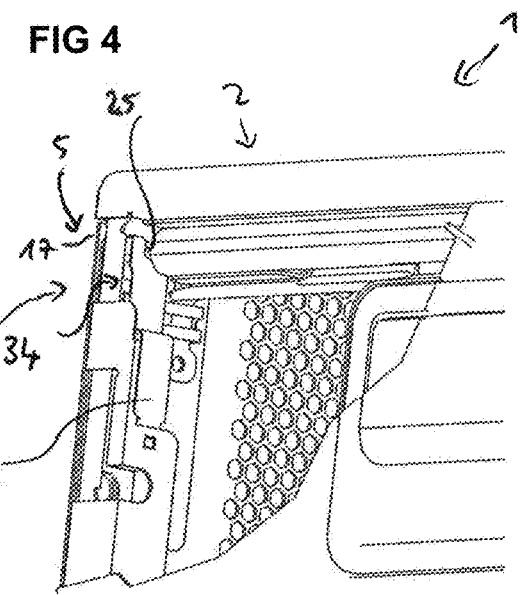
FIG. 4 is a schematic, perspective detail of a broken view of the computer system.
Figure 5:
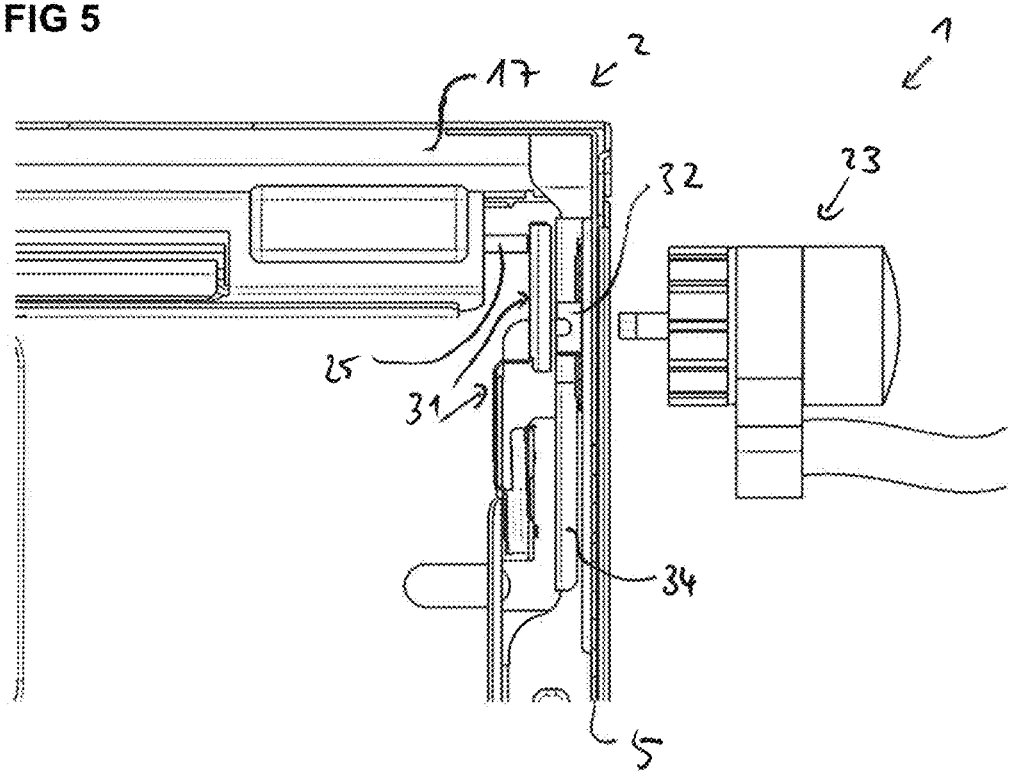
FIGS. 5 and 6 are two schematic sectional views of the computer system with the Kensington lock and the locking element.
Figure 6:
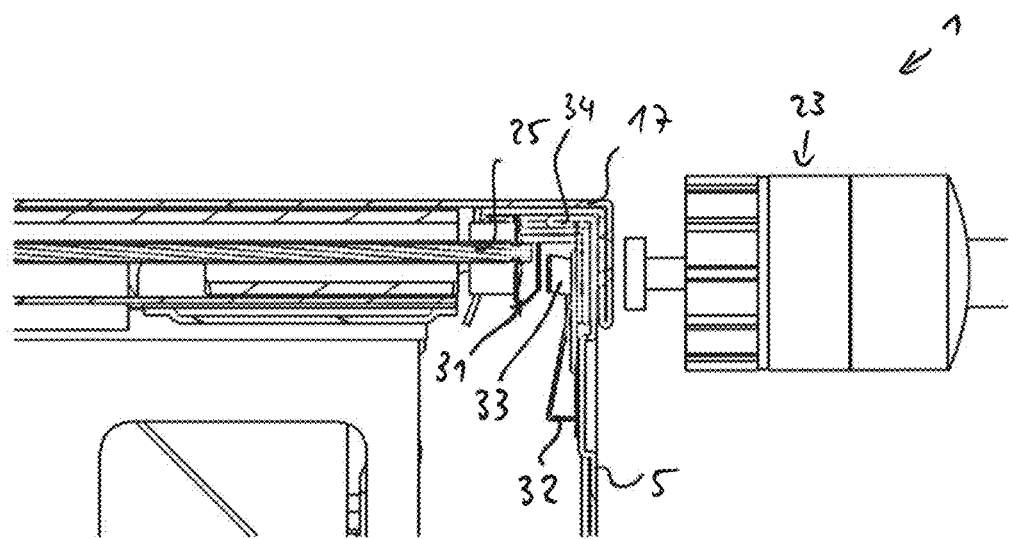

Furthermore, FIGS. 3 and 4 show a second spring element 32 secured to the rear side 5 of the chassis 3. The second spring element 32 has a coupling element 33 formed as an actuation lug. The second spring element 33 is formed or designed such that it covers the fixing opening 24 formed in the rear side 5 in a state not stressed by the Kensington lock 23, for example. The second spring element 32 is formed and arranged on the chassis 3 so that it is actuated upon insertion of the Kensington lock 23. The second spring element 32 is moved against a spring force such that the coupling element 33 is moved against the first spring element 31 and, as a result, the first spring element 31 is actuated. This causes the displacement of the locking bar 25 so that the locking bar is capable to cooperate with the chassis 3 and secures the side panel 17 to the front side 4, as described.

The second spring element 32 ensures that an axial offset is compensated. Thus, reinforcements 34 in the chassis 3 (see FIG. 4) can be provided, which stabilize the chassis 3. The reinforcements 34 can be bent lugs, folds or deformations of the chassis protruding inward from the rear side 5, e.g. in the direction of the front side 4. The side panel 17 can be mounted by the second spring element 32, wherein the elements secured internally on the side panel 17, e.g. the first spring element 31 and the locking bar 25, can be reliably guided into the chassis interior 11 on the external reinforcements 34 (see FIG. 6).

In the described example, various features can be implemented alternatively (not shown). For example, other components can be provided in the interior of the chassis 3, and the configurations of the front and rear sides 4, 5 can also be different, e.g. in terms of the openings, terminal areas and the like. Furthermore, mounting the side panel 17 can also be effected by insertion instead of by the described suspension and pivoting. It is also possible to provide another type of locking device instead of a Kensington lock. The essential factor is that the locking bar 25 is supported and actuatable accordingly.

The further aspect of locking the hard disk cover 9 can optionally also be omitted. Furthermore, another cover, cover plate or component of the computer system 1 can be locked by the engagement element 1 instead of this locking.

What is claimed is:

1. A computer casing for a computer system comprising:
   a chassis that receives components of the computer system, wherein the chassis comprises a front side and a rear side opposite the front side; and
   a removable side panel that can be secured to the chassis to cover an interior of the computer casing;
   wherein
   the side panel comprises an opening and a displaceable locking element; and
   in a secured state of the side panel, a Kensington lock formed to secure the side panel to the chassis can be inserted through the opening of the side panel and a fixing opening such that the locking element is actuated in a direction of the front side and mechanically cooperates with the chassis in the region of the front side.

2. The computer casing according to claim 1, wherein the side panel comprises an engagement element in a region assigned to the front side of the chassis, which engagement element is formed to mechanically cooperate with a further component of the computer system or the chassis to lock the component in the secured state of the side panel.

3. The computer casing according to claim 1, wherein the further component is a drive cover for one or multiple storage media.

4. The computer casing according to claim 1, wherein the locking device has an elongate section, which for locking, is guided through the opening and the fixing opening and actuates the locking element.

5. The computer casing according to claim 1, wherein the locking element is formed as a locking bar.

6. The computer casing according to claim 1, wherein the locking element is displaceable on the side panel between a locked position in which the locking element cooperates with the chassis in the region of the front side, and an unlocked position in which a removal of the side panel is enabled.

7. The computer casing according to claim 6, wherein the side panel comprises a first spring element that cooperates with the locking element such that the locking element is moveable to the locked position against a spring force of the first spring element.

8. The computer casing according to claim 1, wherein the rear side of the chassis comprises a second spring element arranged and/or formed such that when inserting the locking device to secure the side panel, the second spring element is actuated against a spring force that transmits a force to the locking element.

9. The computer casing according to claim 8, wherein the second spring element comprises a coupling element moved against the spring force in the direction of the locking element upon actuation of the second spring element.

10. A computer system comprising the computer casing according to claim 1.

\* \* \* \* \*